United States Patent

[11] 3,576,064

| [72] | Inventor | Earl R. Brackin<br>Lakewood, Calif. |
|---|---|---|
| [21] | Appl. No. | 762,722 |
| [22] | Filed | Sept. 26, 1968 |
| [45] | Patented | Apr. 27, 1971 |
| [73] | Assignee | McDonnell Douglas Corporation<br>Santa Monica, Calif. |

[54] RIVET REMOVING TOOL AND METHOD
3 Claims, 6 Drawing Figs.

[52] U.S. Cl. ................................................. 29/254, 81/52.35
[51] Int. Cl. .................................................. B25b 19/00, B23p 19/04
[50] Field of Search ........................................ 81/52.35; 29/254, 255, 256, 283; 83/686 (Inquired); 30/368

[56] References Cited
UNITED STATES PATENTS

| 904,714 | 11/1908 | McGrath | 83/686 |
| 1,362,911 | 12/1920 | Astin | 29/283 |
| 3,208,134 | 9/1965 | Krewson | 29/427X |
| 3,043,002 | 7/1962 | Brown | 29/427X |
| 957,154 | 5/1910 | Gallinek | 30/368 |
| 1,698,783 | 1/1929 | Ditson | 81/52.35UX |

FOREIGN PATENTS

| 923,811 | 4/1963 | Great Britain | 83/686 |

*Primary Examiner*—James L. Jones, Jr.
*Attorney*—J. Edwin Coates

ABSTRACT: Tool comprises rivet punch and driver. In preferred form punch has forward shank with blunt convex tip to engage rivet head coaxially of rivet shank. Aft body portion of punch preferably is a cylindrical shank to slidably mount in driver which is preferably conventional rivet gun, or "rattle gun." Driver rattles punch against rivet head with sufficient force to gradually shear peripheral portion of rivet head from shank and drive shank out of hole in workpiece. Tip and slightly coned shank of punch are slightly smaller than diameter of rivet shank. Size relation, nonrotation, and absence of cutting edges prevent any damage to workpiece.

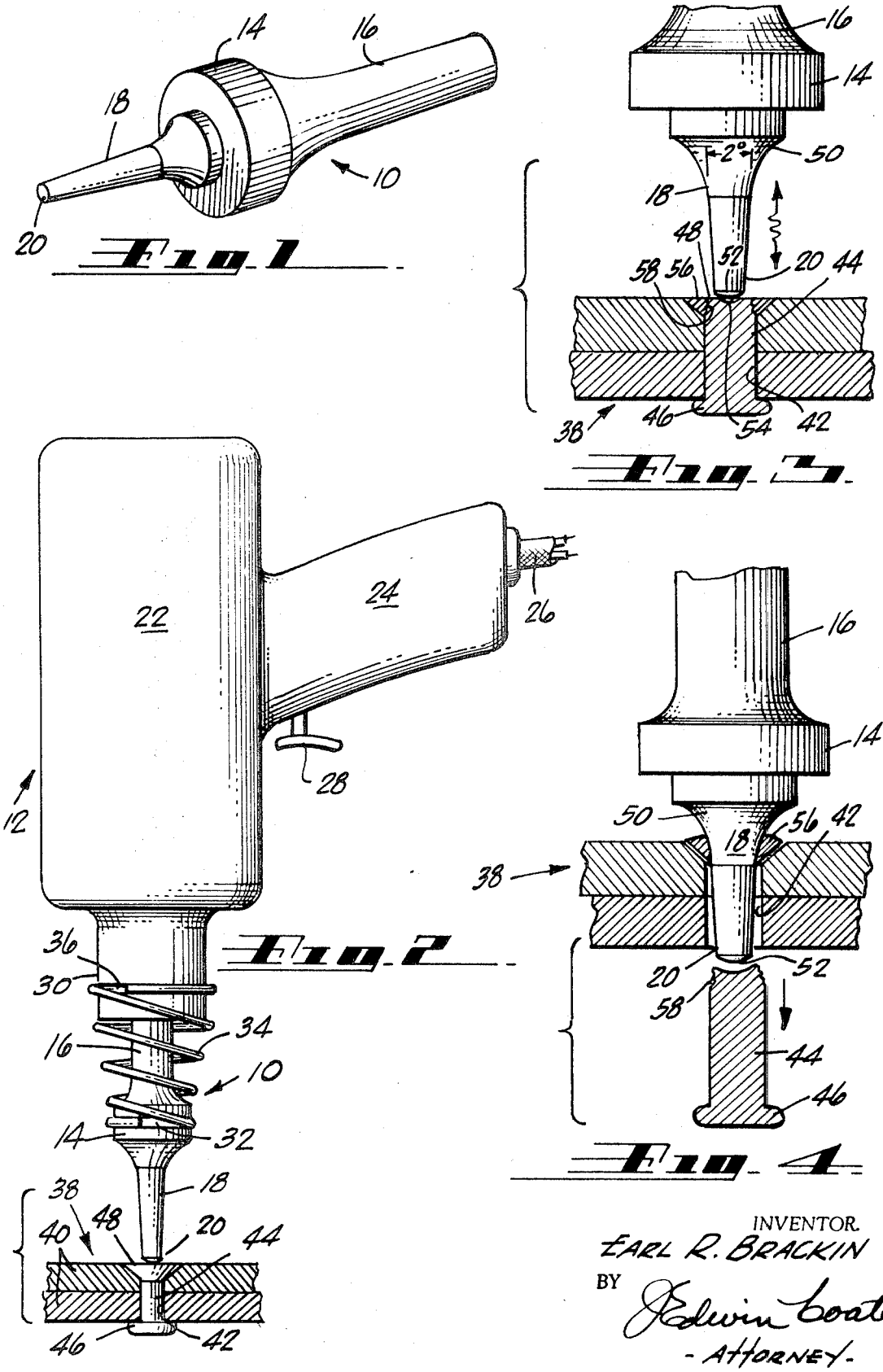

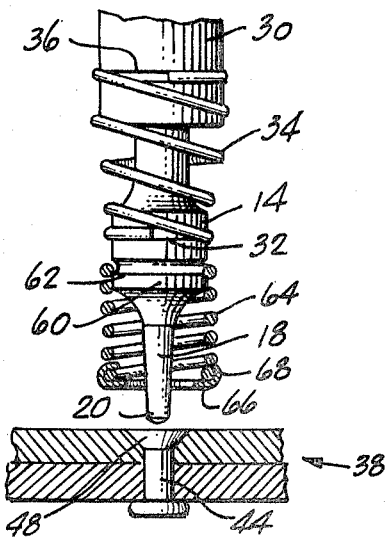
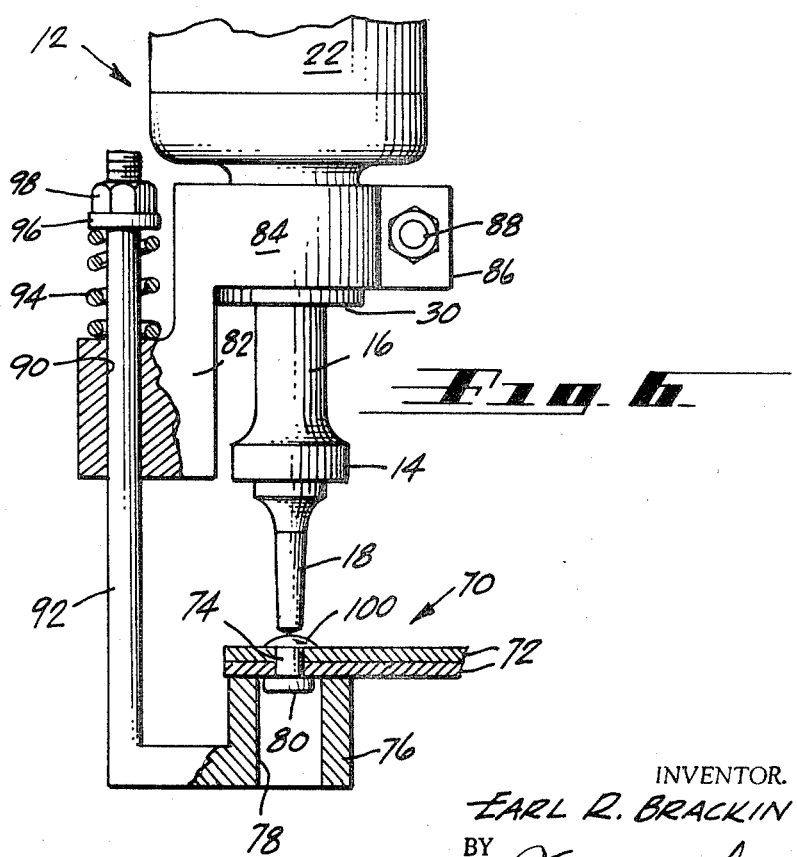

RIVET REMOVING TOOL AND METHOD

BACKGROUND OF THE INVENTION

This invention lies in the field of shop equipment used in dismantling workpieces into their component parts for repair or replacement and relates to means and methods for removing rivets from aligned apertures in components of workpieces. It is particularly directed to a tool and method of maximum simplicity which will separate a rivet from a portion of its head and drive the rivet shank out of the workpiece aperture without cutting or otherwise damaging the workpiece or aperture.

It is a common occurrence in many industries, and particularly in the aircraft industry, to encounter the need to dismantle structures which have been riveted together with the intention of making a permanent assembly. In some cases dismantling is required for examination of inaccessible areas. In other cases it is necessary in order to replace or repair some component which has been damaged during manufacture or use.

The standard procedure is to drill each rivet out. While this appears to be a simple operation in terms of action required, it has several disadvantages. The head of the rivet, or more properly the laterally extending peripheral portion which abuts the workpiece, must be completely separated from the shank so that the latter may be removed from the remote side of the workpiece. Ordinarily a drill is used which is of the same diameter as the rivet shank. It must be very accurately centered on the rivet head and must be urged forward very accurately coaxial with the shank so that when it reaches the depth of the head it will have cut away all of the metal connecting the head to the shank. It is very difficult to center a hand-held drill initially and also to maintain it coaxial during the drilling operation.

If the drill wanders laterally or the operator holds it at even a small angle to the rivet axis, the metal separation will not be complete and the cutting edges of the drill will damage the workpiece. To avoid these difficulties it is necessary to work slowly and carefully. Even with reasonable care it is not uncommon to damage 20 to 25 percent of the rivet holes. Additional time is lost in breaking the rivet heads off the shanks so that they can be removed.

SUMMARY OF THE INVENTION

The present invention provides a very simple, inexpensive, and completely reliable tool and method for removing rivets which solves the problems mentioned above. The production rate is much higher and there is no damage to rivet holes or structure.

Generally stated, in its preferred form the tool comprises a rivet punch and a driver. The latter will ordinarily be a conventional rivet gun, or "rattle gun," which acts to apply a succession of rapidly repeated impulses or impacts to a rivet driving tool. The punch has an aft body portion which fits into the gun to receive impacts in the same way as the rivet driving tool, and reciprocates axially. The forward portion of the punch comprises a slender elongate shank which has a bluntly convex forward free tip, the shank diverging rearwardly to form a portion of a cone with a very small included angle. The tip is preferably formed as a very small portion of a spherical surface which has been found to render the punch self-centering as opposed to a pointed tip which will not recover from an eccentric position. The shank of the punch is preferably of circular cross section and somewhat smaller than the diameter of the rivet shank and rivet hole so that it can pass through the latter without damage and drive the rivet out.

In operation, the tool is held in position with the tip of the punch in contact with the rivet head and the punch shank substantially coaxial with the rivet shank. The tool may engage either the bucked head or the manufactured head, but the latter is preferred because it usually has a small central dimple which aids in initially centering the punch. When the tool is aligned, the driver is actuated to apply a succession of rapidly repeated axial blows to the punch. The workpiece comprises two or more sheets of metal, such as an aluminum alloy, the total thickness of which is ordinarily in excess of a quarter inch. The workpiece thus serves as an anvil to back up the peripheral portion of the rivet head. The repeated blows stress the metal in the head and gradually cause it to fail in shear along a generally annular surface coaxial with the rivet and slightly smaller in diameter than the rivet shank. The peripheral head portion snaps off and moves rearwardly on the punch shank as the latter moves into the hole and drives the rivet out. The taper on the punch shank enlarges the rivet head portion, which drops off when the shank is removed.

BRIEF DESCRIPTION OF THE DRAWINGS

Various other advantages and features of novelty will become apparent as the description proceeds in conjunction with the accompanying drawing, in which:

FIG. 1 is a perspective view of the punch component of the tool;

FIG. 2 is a side elevational view of the punch mounted on the driver with the punch tip in operative engagement with a rivet head;

FIG. 3 is a side elevational view, partly in section, showing the punch in engagement with the rivet head and also showing the stress lines resulting from the punching action;

FIG. 4 is a similar view showing the rivet shank sheared from the rivet head portion and driven out of the hole;

FIG. 5 is a side elevational view of the tool in one modified form; and

FIG. 6 is a side elevational view of the tool in another modified form.

DESCRIPTION OF THE PREFERRED EMBODIMENTS

The basic rivet removing tool, as seen in FIGS. 1 and 2, comprises a rivet punch 10 and a driver 12, the punch being adapted to be slidably mounted for reciprocation in the forward end of the driver. The punch, which is a unitary body, includes a central section 14, an aft body portion of shank 16, and a forward punch portion in the form of a slender elongated shank 18 having a blunt rounded convex tip 20. The driver may be a conventional rivet gun, or "rattle gun," having a main body 22 containing a reciprocating hammer motor, not shown, and having a handle 24 connected to a source of pressurized air by hose 26 and provided with a trigger valve 28 to control application of the air. A hollow boss 30 at the forward end of the gun slidably receives shank 16 of the punch in position to be reciprocated by the hammer motor.

The rivet gun shown delivers a succession of rapidly repeated impulses or impacts in an axial direction to any tool which is mounted in boss 30, and the impacts or blows are of sufficient force to stress the metal of a rivet beyond the yield point and cause the desired shearing action. While the conventional rivet gun is preferred for reasons of simplicity, cost, and availability, a driver of other design may be used so long as it delivers rapid blows of the desired force, and aft body portion 16 of the punch may be of any shape necessary for attachment to such driver.

The central section 14 of the punch, as seen in FIG. 2, is cylindrical and larger in diameter than portions 16 and 18. It may be provided with an annular recess or groove 32 to receive the forward end of coil spring 34, the aft end of which is seated in annular recess 36 in boss 30. The spring acts as a safety device to allow reciprocation of the punch to the desired extend while preventing inadvertent separation. The workpiece 38 comprises two sheets of metal 40 with aligned apertures 42 receiving the shank 44 of a rivet having a bucked head 46 and a manufacturer head 48. The tool is aligned as shown with tip 20 in contact with the center of head 48 and shank 18 substantially coaxial with shank 44 of the rivet. When the driver is actuated, the repeated blows of the punch against the rivet head will snap off the peripheral portions of the head and drive the rivet shank out of the workpiece as pointed out in detail hereinafter.

FIGS. 3 and 4 show the detailed shape of the punch portion and its action in removing the rivet. It will be observed that shank 18 is circular in cross section and tapers divergently rearwardly to form a portion of a cone with an included angle of the order of 2°, which has been found to be very satisfactory in practice. Rearward of the conical portion the shank has a rather abrupt flare as shown at 50, which may have the form of an arc of revolution. The conical portion has a length at least as great as the length of the rivet shank to be removed. In most cases a length equal to about four times the diameter of tip 20 will be satisfactory. The diameter of the conical portion of the punch is less than that of the rivet shank 44 and aperture 42, with tip 20 being about 85 percent of the diameter of the rivet shank. The forward surface 52 of tip 20 is preferably a very small portion of a sphere having a radius of curvature which is of the order of twice the diameter of the tip. Thus, the tip is quite blunt but convex and will center readily in dimple 54 of rivet head 48. Moreover, it has a self-centering tendency throughout the operation.

The effect of applying rapidly repeated axial impacts to the rivet head is illustrated in FIG. 3. As the material begins to yield, an annular cylindrical or slightly conical shear zone is developed between the continuation of shank 44 and the laterally extending peripheral portion 56 of head 48, as indicated by shear lines 58. As the impacts continue, the material fails and the peripheral portion 56 snaps off the shank 18 drives rivet shank 44 out of aperture 42 as illustrated in FIG. 4. It will also be noted that collar or rivet portion 56 is driven relatively rearwardly on the shank 18. This enlarges the collar and it readily falls off the shank when the latter is removed from the workpiece. In some cases the collar is driven onto flare 50. When the punch penetrates as deeply as shown in FIG. 4, collar 56 will lie between the rivet seat and the flare and prevent any possible damage.

In the event that shank 18 has little or no taper or the collars 56 do not release readily for any other reason the construction shown in FIG. 5 overcomes the difficulty. The punch and gun units are identical to those previously described except that the punch has an intermediate section 60 with an annular groove or recess 62 which receives the aft end of coil spring 64 surrounding shank 18. A platelike stripper 66 surrounds shank 18 and is secured to the outer free end of spring 64 by flange 68. When the punch snaps off the rivet head and enters workpiece 38, the stripper will engage the resulting collar 56, and spring 64 will be compressed. When the punch is removed from the workpiece, the force exerted by the spring will push the stripper forward and drive the collar off the punch shank.

Spring 64 is designed to serve a dual purpose. In addition to supplying force for the stripper it acts as a depth limiting stop for the punch. It will be observed that the coils of the spring are slightly spaced when the spring is not under load. The wire gauge, the coil spacing, and the number of turns are so chosen that when the spring is fully compressed with all turns in contact, the compressed length is such that with the free end in contact with the work, the punch is limited in its extent or depth of penetration to a predetermined extent which will not allow the punch to damage the workpiece.

When the workpiece to be dismantled comprises several pieces of heavy gauge material, the workpiece itself serves an an anvil and is not distorted by the punch forces. This is the case in the situations previously described. However, if the invention is to be used on structures in which the total thickness of the workpiece is not great, such as one-eighth inch or less, then the structure will be distorted unless some backup means is provided. In FIG. 6, the workpiece 70 is shown as comprising two light gauge sheets of metal 72 secured together by a rivet 74 which is to be removed.

Backup means is provided in the form of a hollow anvil 76 having an aperture 78 large enough to freely surround head 80 of rivet 74 so that it can set solidly against the remote side of the workpiece. A guide bracket 82 is mounted on gun 12 by means of an integral clamp 84 surrounding boss 30 of the gun and provided with ears 86 to receive a clamping bolt 88. It is also provided with a guide bearing 90. Anvil 76 is provided with a support arm 92 which is slidably mounted in bearing 90. It is constantly yieldably drawn rearwardly by spring 94 surrounding the aft end of arm 92, washer 96 and adjusting nut 98. The dimensions are so chosen that the anvil will apply a substantial pressure to the remote side of the workpiece when punch shank 18 is applied to rivet head 100, and will move toward the rivet gun as the punch snaps the rivet head.

The tool and method described above have solved all of the problems of the tools and methods previously used. There are no rotating parts with cutting edges to damage the work. The need for extreme accuracy of operation has been eliminated. The only special components are inexpensive and last up to 500 times as long as drills. The degree of skill required is substantially less. The two most important features are quality and rate of production. The previous method is slow and results in damage to 20 to 25 percent of all rivet holes. Extensive test demonstrations have shown that the present tool and method result in the removal of 10 to 15 times as many rivets in the same period of time with no damage to any rivet hole.

It will be apparent to those skilled in the art that various changes may be made in the construction as disclosed without departing from the spirit of the invention, and it is intended that all such changes shall be embraced within the scope of the following claims.

I claim:

1. A rivet removing tool comprising; a driver having means for mounting a rivet engaging member and provided with means to apply a succession of rapidly repeated axially directed impulses to the member; and a rivet punch having an aft body portion mounted to said driver to be reciprocated thereby and a forward punch portion secured to said body portion; said punch portion comprising an elongate punch shank having an axis extending in the direction of reciprocation; the tip of said shank being adapted to be applied to the head of said rivet coaxially of the rivet shank and to apply a succession of axial blows thereto with sufficient force to shear the peripheral portion of the head from the shank and drive the latter out of the workpiece; and a backup tool connected to said driver; said backup tool including a hollow anvil to engage the workpiece at the side remote from the rivet punch and surround the remote head of the rivet.

2. A rivet removing tool as claimed in claim 1 including a support arm connected to said anvil and slidably mounted on said driver for movement parallel to the direction of reciprocation of the rivet punch; and adjustable means to vary the distance between the anvil and the rivet punch to accommodate variations in the thickness of the workpiece.

3. A rivet removing tool as claimed in claim 1 including a support arm connected to said anvil and slidably mounted on said driver for movement parallel to the direction of reciprocation of the rivet punch; and resilient means to yieldingly urge the anvil and support arm toward the driver to resist the thrust of the rivet punch.